United States Patent [19]

Hehl

[11] 4,373,890
[45] Feb. 15, 1983

[54] MECHANICAL SAFETY COVER INTERLOCK FOR INJECTION MOLDING MACHINE

[76] Inventor: Karl Hehl, Arthur-Hehl-Strasse 32, 7298 Lossburg 1, Fed. Rep. of Germany

[21] Appl. No.: 320,890

[22] Filed: Nov. 13, 1981

[30] Foreign Application Priority Data

Nov. 13, 1980 [DE] Fed. Rep. of Germany ....... 3042712

[51] Int. Cl.³ ................................................ B29F 1/00
[52] U.S. Cl. ............................ 425/153; 425/DIG. 45
[58] Field of Search ................ 425/151, 153, DIG. 45

[56] References Cited

U.S. PATENT DOCUMENTS 3,386,133 6/1968 Weiner ................................ 425/153
3,771,936 11/1973 Moslo .................................. 425/153

FOREIGN PATENT DOCUMENTS

1212082 3/1960 France ....................... 425/DIG. 45

Primary Examiner—Thomas P. Pavelko
Attorney, Agent, or Firm—Joseph A. Geiger

[57] ABSTRACT

A mechanical interlock mechanism for the safety cover of the die closing unit of an injection molding machine which has an arresting rod attached to the movable die carrier frame and extending rearwardly through a stationary cylinder head plate, where an arresting unit encloses a pair of arresting jaws with attached cam followers. The latter are engaged by a control rod which is connected to the safety cover by means of a control linkage. The jaws are forcibly closed, in opposition to jaw opening springs, and butting of the arresting jaw ridges against the arresting rod collars is limited to one jaw only, as a result of an axial offset between the arresting jaw ridges, in connection with a certain minimal pitch of the arresting rod collars and a floating arrangement of the jaw closing assembly. The latter is spring-biased towards one side.

8 Claims, 11 Drawing Figures

MECHANICAL SAFETY COVER INTERLOCK FOR INJECTION MOLDING MACHINE

BACKGROUND OF THE INVENTION

1. Field of the Invention

The present invention relates to injection molding machines and, more particularly, to a mechanical interlock mechanism which is actuated by the safety cover of the die closing unit of an injection molding machine, arresting the movable die carrier member, whenever the safety cover is not in its closed position.

2. Description of the Prior Art

From the prior art in this field are known several safety cover interlock devices, including one which is disclosed in my prior U.S. patent application, Ser. No. 170,920, now U.S. Pat. No. 4,340,346. This device features two arresting rods which are attached to the movable die carrier frame so as to extend rearwardly through bores in a stationary cylinder head plate of the die closing unit. To the rear side of this cylinder head plate are attached two cooperating arresting units, each enclosing a pair of toothed arresting jaws which are movable into and out of engagement with annular teeth of the arresting rods.

The movements of the arresting jaws are obtained by means of control rods which are attached to the safety cover of the die closing unit and extend likewise rearwardly through the cylinder head plate and its attached arresting unit. Appropriate cam surfaces on the control rods cooperate with cam followers which forcibly separate the arresting jaws, when the safety cover is closed. Springs press the arresting jaws against the arresting rod, as soon as the safety cover is opened a short distance. The arresting jaws are arranged on opposite sides of each arresting rod, being guided for straight-line movements by the walls of the arresting unit housing. The cam followers are similarly arranged on opposite sides of the control rod, each cam follower being connected to its associated arresting jaw by means of a transverse follower shaft and a pair of drive links.

One shortcoming which is common to this and all the other known prior art interlock devices is that the approach movement which produces the arresting engagement is not a positive movement but is produced by springs or, in some cases, by gravity. It is therefore possible to defeat the interlock action of each one of these devices by blocking the mechanism in the disengaged position.

Another shortcoming of the device just described relates to the fact that the latter provides an arresting action only against the closing movement of the movable die carrier member, because of its sawtooth-shaped succession of annular grooves defining the abutment flanks which provide the arresting action. This groove profile is one which combines planar abutment faces with relatively narrow peripheral shoulders. The latter have to be as narrow as possible, in order to minimize the possibility that the approaching arresting jaws, which have similar shoulders on their inner arcuate peripheries, butt against the shoulders of the arresting rod.

SUMMARY OF THE INVENTION

Underlying the present invention is the primary objective of improving upon the above-mentioned mechanical interlock device in such a way that an opening movement of the safety cover produces a forcible closing movement on a pair of arresting jaws against an arresting rod, without the possibility of a butting interaction between the jaws and the rod.

The present invention proposes to attain this objective by suggesting an improved mechanical safety cover interlock mechanism for the die closing unit of an injection molding machine, the mechanism featuring an arresting rod which has a series of annular arresting collars and moves through an arresting unit. The latter encloses two arresting jaws with matching arcuate ridges which are closable against the arresting rod by means of a control rod and a pair of cooperating cam followers. The arresting jaws are forcibly closed against the control rod, as soon as the safety cover is moved from its closed position, the jaw opening movement being produced by compression springs.

In a preferred embodiment of the invention, the arresting collars on the arresting rod have axially oppositely facing abutment flanks, and the arresting jaws have cross-sectionally similarly shaped arresting ridges with opposing abutment flanks engaging the flanks of the arresting rod collars in the closed jaw position. The arresting jaws are enclosed and guided between two guide walls of the arresting unit housing which transmits the arresting forces to a stationary member of the die closing unit. The arresting action is the same against a die opening movement as against a die closing movement.

The present invention further suggests an arrangement of the arresting rod collars and cooperating arresting jaw ridges in such a way that forcible engagement of at least one arresting jaw can take place under any operational condition, the configuration being such that it is impossible to obtain a butting action between arresting collars and arresting ridges on both arresting jaws. This is accomplished by an axial offset of the arresting ridges of one jaw relative to those of the other jaw by one-half the axial distance between arresting ridges, in combination with an axial spacing of the arresting collars and arresting ridges to a pitch at which the collar distance is equal to or greater than twice the combined axial widths of the arresting collar and the arresting ridge.

By further arranging for the arresting jaws and the associated movement mechanism to be "floating", i.e. indeterminate in its position in the direction of jaw movement relative to the arresting unit housing, it is possible to always obtain engagement of at least one of the two arresting jaws, if a butting condition is encountered on the other arresting jaw. The closed position of the arresting jaws is preferably such that, in a butting condition between arresting collars and the arresting ridges of one jaw, the arresting ridges of the other jaws are fully engaged between the arresting rod collars.

The proposed floating arrangement of the arresting jaws and of the associated control mechanism allows for a butting action on either of the two arresting jaws. In the event that no butting takes place, bias springs move the floating assembly to one side, so that full engagement of one jaw, rather than partial engagement of both jaws, is obtained.

In order to obtain the indeterminate condition of the arresting jaws during their closing movement in conjunction with a positively operating jaw drive mechanism, the invention further suggests a control rod which, while driving a pair of cam followers which are attached to the arresting jaws, is itself capable of shifting in a transverse direction, to accommodate the different positions of the closed arresting jaws which may be necessary for various arresting rod positions. This is accomplished by attaching one extremity of the control rod to its drive arm by means of a universal joint.

The novel arresting mechanism of the present invention offers the unique advantage of providing a positive, tamper-proof jaw closing action, without the possibility of ever developing a jamming condition between the arresting jaws and the arresting rod in any arresting rod position, including situations in which the arresting rod is in motion. Unlike arresting jaws which are closed by spring action and which, consequently, can easily be maintained in an open state to defeat the arresting mechanism, the suggested novel arresting mechanism with its positive jaw closing action can only be defeated by dismantling its control linkage.

BRIEF DESCRIPTION OF THE DRAWINGS

Further special features and advantages of the invention will become apparent from the description following below, when taken together with the accompanying drawings which illustrate, by way of example, an embodiment of the invention which is represented in the various figures as follows.

DESCRIPTION OF THE PREFERRED EMBODIMENT

Figure 1:
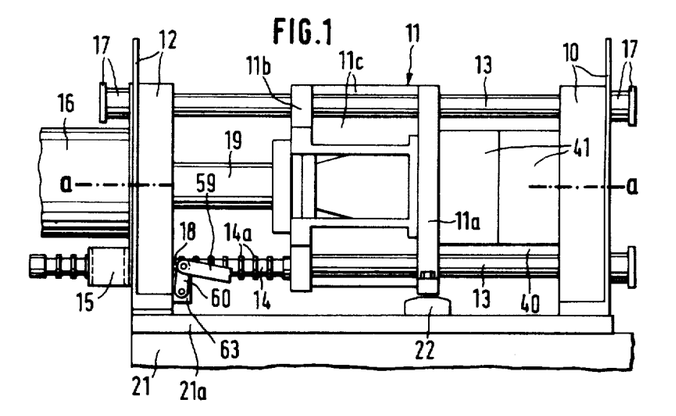
FIG. 1 shows, in a somewhat schematic elevational view, a die closing unit of an injection molding machine with a mechanical safety cover interlock mechanism embodying the present invention, the safety cover itself being not shown.
Figure 2:
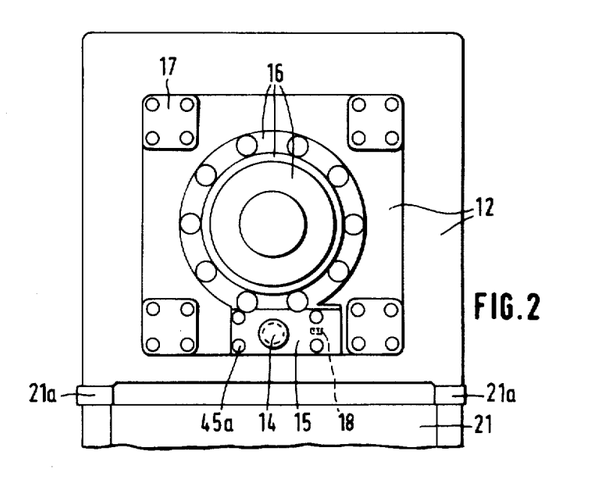
FIG. 2 shows the die closing unit of FIG. 1 in an enlarged end view.
Figure 9:
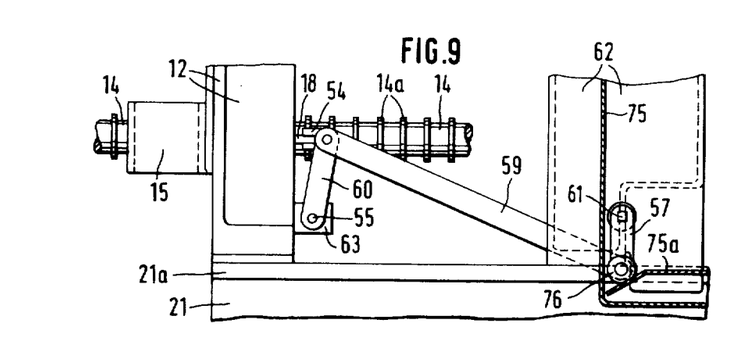
FIG. 9 represents an enlarged portion of the die closing unit of FIG. 1, including a portion of the safety cover.
Figures 10, 10A:
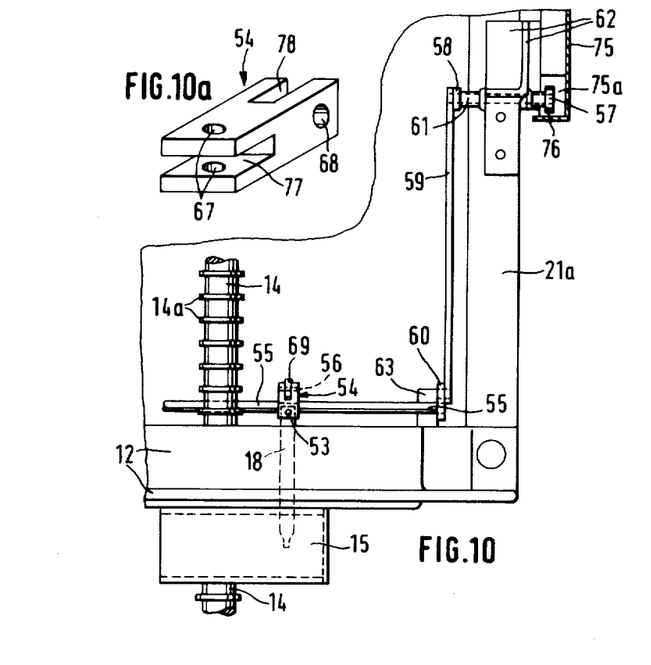
FIG. 10 is a rotated plan view corresponding to FIG. 9.
FIG. 10a shows a further enlarged universal joint forming a part of the mechanism of FIGS. 9 and 10.

The die closing unit of FIGS. 1 and 2, portions of which are also shown in FIGS. 9 and 10, is mounted on a reinforcement ledge 21a of a machine base 21. It consists essentially of a stationary die carrier plate 10, a movable die carrier frame 11, and a stationary cylinder head plate 12, the plates 10 and 12 being attached to the ledge 21a and interconnected by means of four tie rods 13 to form a rigid frame.

The movable die carrier frame 11 is guided on the tie rods 13 for longitudinal opening and closing movements along the main axis a—a of the die closing unit. The four tie rods 13 include special clamping assemblies 17 on both extremities. The movable die carrier frame 11 is additionally supported on the lateral ledges 21a of the machine base 21 by means of adjustable slide shoes 22.

The die carrier frame 11 includes a die mounting wall 11a, a rearwardly spaced pressure transfer wall 11b, and intermediate pressure transfer ribs 11c. On its die mounting wall 11a, it carries one of the two halves of an injection molding die 41, the other die half being mounted on the stationary die carrier plate. Extending rearwardly from the stationary cylinder head plate 12 is a coaxially mounted power cylinder 16 whose piston rod 19 is connected to the pressure transfer wall 11b of the movable die carrier frame 11.

The die area 40 is normally covered by a generally U-shaped safety cover, but this cover is not shown in FIG. 1. The rearward end portion of the cover panel 75 in its closed position is shown in FIGS. 9 and 10.

FIG. 1 also shows, as part of the present invention, an arresting rod 14 which extends rearwardly from the pressure transfer wall 11b of the movable die carrier frame 11, in parallel alignment with the tie rods 13. The arresting rod 14a has on its surface a series of regularly spaced annular arresting collars 14a. It cooperates with an arresting unit of which the housing 15 is mounted on the rear side of the stationary cylinder head plate 12, as can be seen in FIGS. 1 and 2. The arresting rod 14 extends through both the plate 12 and the housing 15, moving freely in the axial direction, unless the arresting unit is actuated, in the manner described further below.

Figure 3:
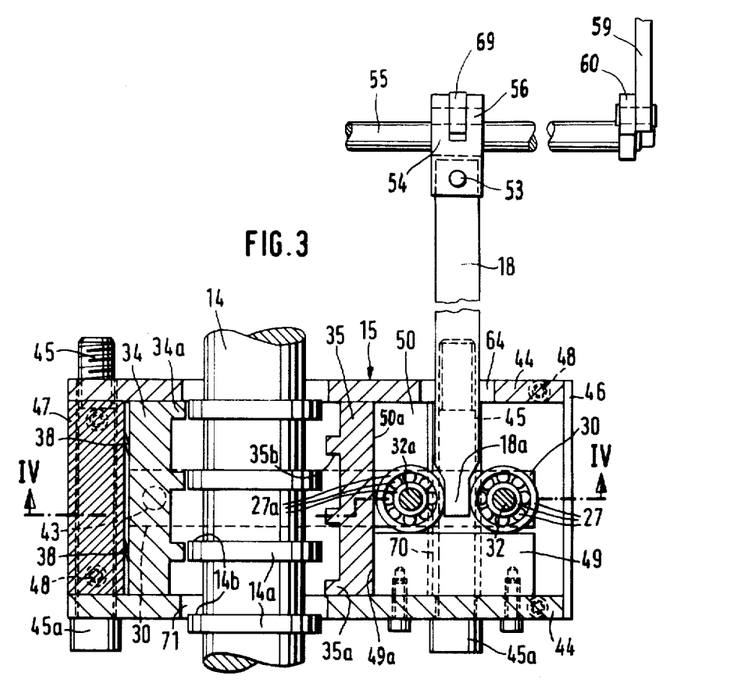
FIG. 3 shows the arresting unit of the safety cover interlock mechanism of FIG. 1 in an enlarged horizontal cross section taken along line III—III of FIG. 4, the mechanism being shown in its normally disengaged condition.
Figure 4:
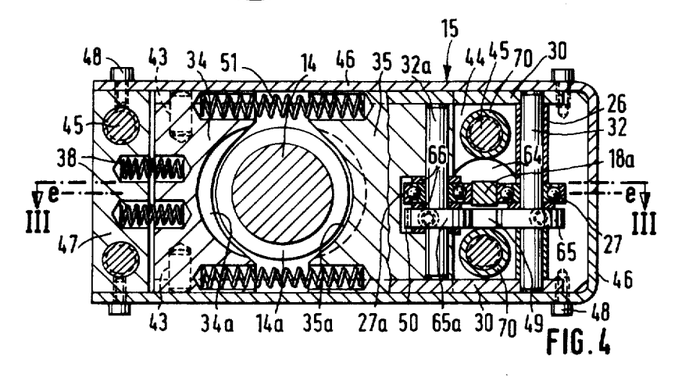
FIG. 4 shows the arresting unit of FIG. 3 in an elevational cross section taken along line IV—IV of FIG. 3.

The arresting unit of the invention is shown in FIGS. 3-8 which represent three different operational configurations, FIGS. 3 and 4 showing the arresting unit in a disengaged or open configuration, and FIGS. 5 and 6 and FIGS. 7 and 8, respectively, showing the arresting unit in two different actuated or closed configurations.

As can be seen in FIG. 3, the arresting unit has a generally block-shaped housing 15 consisting of two parallel transversely oriented guide walls 44, an intermediate end wall 47, and a U-shaped housing shell 46. The end wall 47 on one side of the housing 15 and two guide wall spacers 70 on the other side determine the axial distance between the guide walls 44, in conjunction with four heavy housing bolts 45 which clamp the housing assembly against the outer side of the stationary head plate 12 (FIGS. 1 and 9). The heads 45a of the housing bolts 45 are visible in FIG. 2. The housing shell 46 is attached to the guide walls 44 and to the end wall 47 by means of screws 48.

The two guide walls 44 of the housing 15, as well as the adjoining cylinder head plate 12 (not shown in FIG. 3), have appropriate openings 71 for the moving arresting rod 14. Inside the housing 15 are arranged, on opposite sides of the arresting rod 14, two arresting jaws 34 and 35 which occupy the entire rectangular cross section of the housing cavity, thus being guided for opening and closing movements at right angles to the arresting rod 14.

The arresting rod 14 carries a series of axially regularly spaced arresting collars 14a, the latter having a rectangular cross-sectional outline so as to present planar abutment flanks 14b in both axial directions. The arresting jaws 34 and 35 have cross-sectionally similarly shaped arcuate arresting ridges 34a and 35a, respectively, with axially oppositely facing abutment flanks 34b and 35b, respectively. It follows that, when one or both of the two arresting jaws 34 and 35 are engaged against the arresting rod 14, the latter is positively blocked against axial advance or return, the blocking force being transmitted by the engaged locking jaw to one of the guide walls 44 and from there to the stationary cylinder head plate 12 (FIG. 1).

FIG. 3 shows an arrangement of the arresting rod collars 14a and the cooperating arresting jaw ridges 34a and 35a which is such that, regardless of the momentary axial position of the arresting rod 14, radial butting between the outer peripheral surfaces of the arresting collars 14a and the inner peripheral surfaces of the arresting ridges 34a and 34b can never take place on both arresting jaws 34 and 35 simultaneously. This is accomplished by a configuration which meets two specific geometric conditions in terms of the axial distance, or pitch, of the arresting collars 14a of the arresting rod 14 and in terms of an axial offset between the cooperating arresting collars and arresting ridges on opposite sides of the arresting rod 14.

The first condition requires that the axial pitch of the arresting collars 14a on the arresting rod 14 be equal or greater than twice the combined axial widths of the arresting collars 14a and the arresting ridges 34a or 35a. Therefore, if the two axial widths are identical, the axial pitch of the arresting collars and arresting ridges has to be equal or greater than four times that axial width.

The second condition requires an axial offset of one set of arresting members by one-half this axial pitch. FIG. 3 shows the arresting jaws 34 and 35 to have such an axial offset in their arresting ridges 34a and 35a, respectively. Obviously, the same effect can also be achieved by arranging the axial offset on the arresting collars 14a of the arresting rod 14. In this case, however, the annular grooves which form the arresting collars 14a of FIG. 3 would preferably be replaced by straight tangent grooves and the arresting ridges of the cooperating arresting jaws would then likewise be straight, instead of arcuate.

The arresting jaws 34 and 35 are closed and opened by means of a control rod 18 and a pair of cooperating cam followers 27 and 27a. The control rod 18 extends approximately parallel to the arresting rod 14, reaching through an opening of the stationary cylinder head plate 12 (not shown in FIG. 3) and a bore 64 in the guide wall 44 of the housing 15. As will be explained in more detail further below, the control rod 18 executes an actuation stroke by penetrating into the housing 15, when the safety cover of the die closing unit is moved from its closed position.

The control rod 18 has a rectangular cross section, with and end portion 18a of reduced width and two transitional portions which form cam surfaces 18b on the narrow sides of the rectangular rod. Cooperating with these narrow sides and the cam portions 18b are two cam followers 27 and 27a in the form of ball bearings which are rigidly connected to the two arresting jaws 34 and 35, respectively.

FIG. 4 shows that the cam follower 27a is arranged inside a groove 50 of the proximate arresting jaw 35 and supported by a shaft 32a which is seated in the jaw 35. The cam follower 27 is supported by a similar shaft 32 which is supported on its extremities in a pair of drive links 30 which, in turn, are attached to the distal arresting jaw 34 by means of link pins 43. Appropriate grooves in the arresting jaw 43 position the drive links 30, and similar slightly larger grooves in the arresting jaw 35 allow for a free relative movement between the jaw 35 and the drive links 30.

The two shafts 32 and 32a which carry the cam followers 27 and 27a also carry two counter rollers 65 and 65a, likewise in the form of ball bearings, which are spaced from the cam followers 27 and 27a by means of spacer washers 66. The counter rollers 65 and 65a ride on a counter rail 49, thereby supporting the cam followers 27 and 27a against the axial force component which results from a forcible advance of the control rod 18 against the cam followers, during the actuation of the arresting unit.

FIG. 4 further shows that the two arresting jaws 34 and 35 are spring-biased into the disengaged or open position by means of two pairs of jaw opening springs 51 which are arranged on opposite sides of the arresting rod 14. The springs 51 thus produce a contact pressure between the cam followers 27 and 27a and the cam portions 18b of the control rod 18. Two jaw biasing springs 38, their function to be described further below, are arranged between the housing end wall 47 and the distal arresting jaw 34.

As stated earlier, the arresting unit is actuated, whenever the safety cover of the die closing unit is moved from its closed position. This movement is transmitted to the control rod 18 by means of a transmission linkage, described further below, producing an actuation stroke on the control rod 18 which advances the latter from the position shown in FIG. 3 to the position shown in FIG. 5. In so doing, the control rod 18 forces the cam followers 27 and 27a to ride up on its cam portions 18b, thereby approaching the connected arresting jaws 34 and 35, respectively, towards the arresting rod 14.

Figure 5:
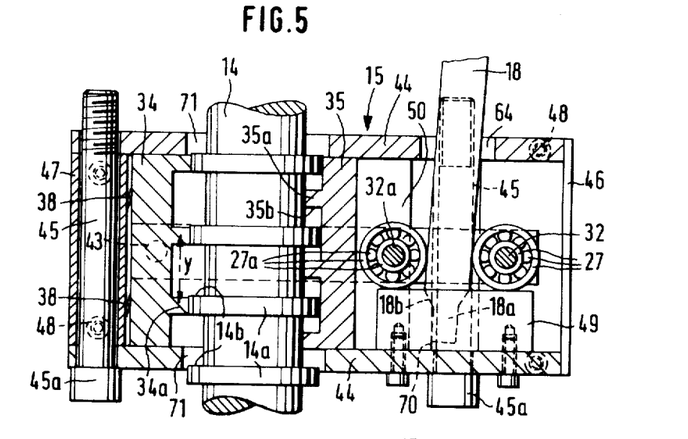
FIGS. 5 and 6 are similar to FIGS. 3 and 4, showing the mechanism of the arresting unit in a first arresting configuation.
Figure 7:
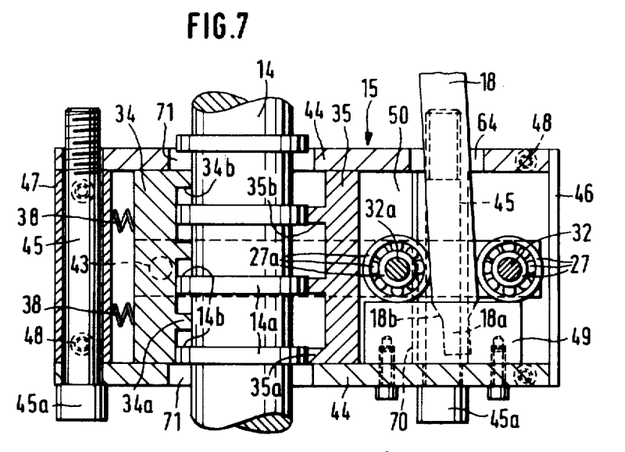
FIGS. 7 and 8 are likewise similar to FIGS. 3 and 4, showing the mechanism of the arresting unit in a second arresting configuration.

As can be seen by comparing FIGS. 5 with 7, one or the other of the arresting jaws 34 and 35 may develop a butting condition between its arresting ridges 34a or 35a, respectively, and the rim of the arresting collars 14a of rod 14. However, the earlier-described arresting geometry assures that, for all possible positions of the arresting rod 14, only one of the two arresting jaws can develop such a butting condition.

The mechanism of the invention tolerates unilateral butting on either side of the arresting rod 14 by providing for the two arresting jaws 34 and 35, their connected cam followers 27 and 27a, respectively, and the control rod 18 to be "floating", i.e. indeterminate in position, relative to the arresting rod 14, during the closing movement of the arresting jaws 34 and 35.

For this purpose, the control rod 18 includes a pivot connection with the transmission linkage, so that at least that portion of the control rod 18 which reaches into the arresting unit housing 15 is free to move in the direction of cam follower movement. Thus, when one cam follower is blocked in position by a butting condition between its arresting jaw and an arresting rod collar, the other cam follower and its arresting jaw execute a movement corresponding to the combined rise of both cam portions 18b of the control rod 18.

Figure 6:
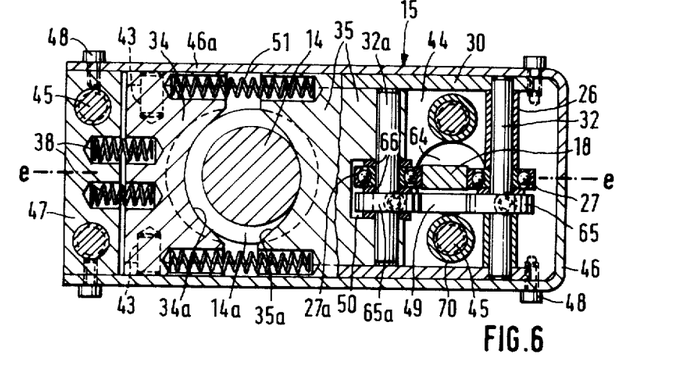

FIGS. 5 and 6, representing a butting condition between the distal arresting jaw 34 and the arresting rod 14, show the cam follower 27 blocked in place, while the opposite cam follower 27a has produced a complete engagement between the arresting jaw 35 and the arresting rod 14. Conversely, FIGS. 7 and 8 show the presence of a butting condition between the near arresting jaw 35 and the arresting rod 14, as a result of which the cam follower 27a is blocked in place, while the opposite cam follower 27 and its connected distal arresting jaw 34 have been moved for a full engagement between the jaw 34 and the arresting rod 14.

A third arresting configuration would be present, if the arresting rod 14 is in such a position that neither the arresting ridges 34a of jaw 34 nor the arresting ridges 35a of jaw 35 encounter an arresting collar 14a, so that both arresting jaws 34 and 35 are free to advance against the arresting rod 14. This configuration is not shown in the drawings, and, because it can produce only a partial engagement of both arresting jaws, it is not desirable and therefore intentionally prevented in the mechanism of the present invention. Such a result is obtained by means of the earlier-mentioned jaw biasing springs 38 which, in effect, produce the same jaw closing condition as would be produced by a butting condition between the arresting ridges 35a of the near arresting jaw 35 and the arresting rod collars 14a.

Figure 8:
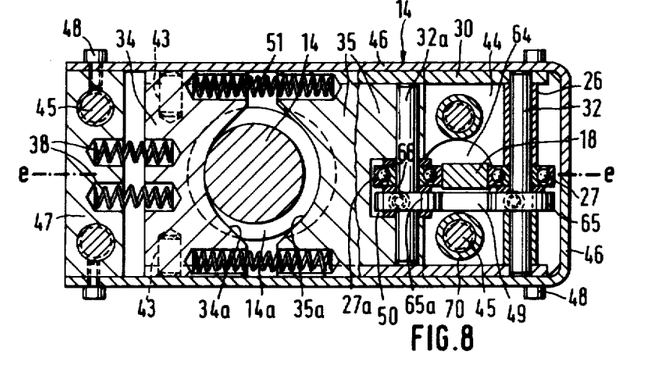

The action of the jaw biasing springs 38 makes the configuration of FIGS. 7 and 8 the normal arresting position for the interlock mechanism of the invention. Consequently, the position of the arresting jaws 34 and 35 in FIG. 5 will tend to switch to the position shown in FIG. 7, if the arresting rod 14 is moved axially so that the arresting ridges 34a of jaw 34 are no longer butting against the arresting collars 14a of rod 14. On the other hand, the jaw biasing springs 38 are considerably weaker than the jaw opening springs 51, so that, even in the open position of the arresting jaws as shown in FIG. 4, for example, the distal arresting jaw 34 is safely held out of engagement with the arresting rod 14.

A closing motion of the safety cover produces a retraction of the control rod 18 from the position of FIG. 5 or FIG. 7 to the position of FIG. 3, allowing the cam followers 27 and 27a to execute an approach movement under the bias of the jaw opening springs 51. The open position of the arresting jaws 34 and 35 is determined by the width of the end portion 18a of the control rod 18 and by an abutment between an end face 49a of the counter rail 49 and the bottom surface 50a of the groove 50 in the arresting jaw 35. The jaw biasing springs 38 produce the abutment force.

The transverse position of the camming portion of the control rod 18 is determined by the positions of the arresting jaws 34 and 35 and their cam followers 27 and 27a, respectively. To guide the arresting rod 18 in the vertical sense, i.e. in the plane e—e of FIG. 4, the guide wall opening 64 may have an appropriate transverse guide insert (not shown), or the opening itself may be of rectangular rather than round shape.

FIGS. 9 and 10 show an example of a control linkage which transmits an actuating force to the control rod 18 of the arresting unit, as soon as the safety cover of the die closing unit is moved away from its closed position. FIG. 9 shows a corner portion of a closed safety cover panel 75 which is guided for axial opening and closing movements in relation to a stationary frame member 62. An opening movement of the cover panel 75 would be a movement to the left side of FIG. 9.

In the stationary frame member 62 is journalled a transversely oriented crank pin 61 which carries a control arm 58 and an aligned crank 57 on opposite ends. The crank 57, in turn, carries a cam follower 76 which rides on a ramp 75a of the cover panel 75. In the closed position of the cover panel 75, shown in FIG. 9, the cam follower 76 engages an inclined end portion of the ramp 75a which allows the crank 57 and the control arm 58 to assume substantially vertical orientations.

As soon as the cover panel 75 is opened, i.e. moved to the left in FIG. 9, the cam follower 76 swings to the left, until it comes to rest on the horizontal portion of the ramp 75a. This movement produces a corresponding displacement of the control arm 58 to which is connected a rearwardly extending transmission rod 59. The opposite end of the transmission rod 59 is connected to the end of a pivot arm 60, on a pivot shaft 55, which is rotatably mounted on the cylinder head plate 12 by means of pivot brackets 63 (FIG. 10). The pivot shaft 55 carries a pivot arm 60 whose distal extremity is connected to the control rod 18 by means of a universal link 54.

The universal link 54 which transmits the rearward motion of the transmission rod 59 to the control rod 18 is shown in an enlarged perspective view in FIG. 10a. A vertical slot 78 in one end portion of the link 54 accommodates the upper extremity of a drive arm 69 which, like the pivot arm 60, is fixedly attached to the pivot shaft 55. A pin 56 in the horizontal bore 68 provides the drive connection. A horizontal slot 77 in the opposite end portion of the universal link 54 accommodates an extremity of the control rod 18, and a vertical pin 53 (FIG. 3) in the vertical bore 67 constitutes the pivot about which the control rod 18 executes its transverse "floating" movements.

It should be understood, of course, that the foregoing disclosure describes only a preferred embodiment of the invention and that it is intended to cover all changes and modifications of this example of the invention which fall within the scope of the appended claims.

I claim the following:

1. In a die closing unit for an injection molding machine which comprises a stationary die half mounted on a stationary die carrier member, a movable die half mounted on a movable die carrier member, a plurality of parallel tie rods guiding the movable die carrier member and defining the longitudinal axis of the die closing unit, a second stationary member located axially outside the area of the injection molding die, behind the movable die carrier member, and an axially openable and closable safety cover preventing access to at least a portion of the area of the injection molding die in its closed position; in said die closing unit, a mechanical safety cover interlock mechanism comprising in combination:

an arresting rod attached to the movable die carrier member and extending axially rearwardly towards the second stationary member, in parallel alignment with the tie rods, said stationary member having an opening for the axial movement of the arresting rod therethrough;

an arresting unit mounted on the second stationary member in alignment with the arresting rod and surrounding the latter; and a control linkage operatively connecting the safety cover to the arresting unit in such a way that a displacement of the safety cover from its closed position actuates the arresting unit in the arresting sense and the complete closing of the safety cover actuates the arresting unit in the releasing sense; and wherein the arresting rod has, on at least that length portion which moves through the arresting unit, a regularly spaced succession of grooves and intermediate arresting collars which occupy at least two diametrally opposite sides of the arresting rod, the arresting collars having at least one of their two axially opposite flanks oriented transversely to the arresting rod axis, so as to serve as an abutment flank;

the arresting unit includes two arresting jaws arranged on diametrally opposite sides of the arresting rod so as to face the arresting collars of the latter, the arresting jaws being guided for movement into and out of engagement with the arresting rod, each arresting jaw having at least one arresting ridge with at least one of its two axially opposite flanks oriented to cooperate with the abutment flank of an arresting rod collar to produce an arresting action on the arresting rod and connected movable die carrier member;

the arresting ridges of the two arresting jaws and the arresting collars on opposite sides of the arresting rod are axially staggered in such a way that, when the arresting rod is positioned to create a butting alignment between an arresting rod collar and an arresting jaw ridge on one side, the ridge of the other arresting jaw is positioned axially half-way between two successive rod collars on the other side;

the axial spacing of the arresting collars on the arresting rod is not less than twice the combined axial widths of an arresting collar and an arresting ridge, so that a simultaneous butting impingement between arresting collars and arresting ridges on both sides of the arresting rod during the engagement approach of the arresting jaws is made impossible for all arresting rod positions;

the control linkage includes means for actuating the arresting unit by forcibly closing the arresting jaws against each other to obtain a radial engagement between abutment flanks of the arresting rod collars and the arresting jaw ridges, the jaw closing force being derived from the safety cover displacement;

said arresting jaw closing means engages the arresting jaws in such a way that the jaw closing force acts on the two arresting jaws without a force reaction from a stationary part of the arresting unit, so that the position of the arresting jaws during their closing movement, while being determinate relative to each other, is indeterminate relative to the arresting rod within the guided mobility of the arresting jaws, and the closed distance of the arresting jaws is such that the arresting ridge of one jaw remains out of engagement with the arresting rod, when the arresting ridge of the other jaw is fully engaged in an arresting rod groove.

2. A safety cover interlock mechanism as defined in claim 1, wherein the arresting collars and intermediate grooves of the arresting rod are annular collars and annular grooves, the arresting collars having both axial flanks oriented transversely to the arresting rod axis, to serve as opposite abutment flanks; and the two arresting jaws each have a plurality of concavely arcuate arresting ridges of the same axial spacing as the arresting rod collars, the arresting ridges having their opposite axial flanks oriented to cooperate with opposing abutment flanks of the arresting rod collars, so as to produce arresting actions in both axial directions; and the arresting ridges of one arresting jaw are axially offset in relation to the arresting ridges of the other jaw by one-half the distance of said spacing.

3. A safety cover interlock mechanism as defined in claim 1 or claim 2, wherein the arresting unit further includes jaw opening spring means urging the arresting jaws away from each other, into an open position, in opposition to the arresting jaw closing means; and the jaw opening spring means, like said jaw closing means, act on the two arresting jaws without a force reaction from a stationary part of the arresting unit.

4. A safety cover interlock mechanism as defined in claim 3, wherein the arresting unit further includes bias spring means biasing one arresting jaw in relation to a stationary part of the arresting unit in the direction of the guided mobility of the jaw, thereby applying said bias to both arresting jaws in those jaw positions that would otherwise be indeterminate; and the force exerted on said arresting jaw by the bias spring means is less than the force exerted on it by the jaw opening spring means.

5. A safety cover interlock mechanism as defined in claim 3, wherein the control linkage further includes a pivot shaft which is journalled on the second stationary member and oriented perpendicularly to the control rod, a pivot arm attached to the pivot shaft, a transmission rod linking the distal extremity of the pivot arm to the safety cover, and a drive arm attached to the pivot shaft in an orientation which is substantially transverse to the control rod; and the distal extremity of the drive arm is connected to an extremity of the control rod by means of a universal joint.

6. A safety cover interlock mechanism as defined in claim 3, wherein the arresting jaw closing means of the control linkage includes a longitudinally movable control rod extending perpendicularly to the movement direction of the arresting jaws and deriving its movements from the safety cover movements, the control rod having cam portions which face in opposite radial directions;

each of the two arresting jaws has connected to it a cam follower, the two cam followers cooperating with the two cam portions of the control rod in such a way that a longitudinal movement of the latter displaces the cam followers in opposite directions, to forcibly close the arresting jaw, and an opposite longitudinal movement of the control rod allows the arresting jaws to be opened; and the control rod also has a lateral mobility in the direction of displacement of the cam followers and arresting jaws, in at least that portion of the control rod which cooperates with the cam follower, thereby making possible said indeterminate state of the arresting jaws during their closing movement.

7. A safety cover interlock mechanism as defined in claim 6, wherein the control rod extends substantially parallel to the arresting rod, alongside one of the two arresting jaws, moving in the same direction as the safety cover to which it is connected;

one cam follower is rotatably supported on the proximate arresting jaw, and the other cam follower is rotatably supported on an extension of the distal arresting jaw; and the arresting unit further includes an arresting unit housing enclosing the arresting jaws and their cam followers, the housing having two walls which extend perpendicularly to the arresting rod axis and serve as guide walls for the moving arresting jaws and as arresting force transmitting walls, when the jaws engage the moving arresting rod.

8. A safety cover interlock mechanism as defined in claim 7, wherein
the cam followers are supported on pins which also carry counter rollers; and
the arresting unit housing further includes a counter roller supporting surface facing against the jaw closing movement of the control rod.

* * * * *